Feb. 17, 1959 L. R. COX 2,874,220

CARRIER DISTRIBUTION CIRCUIT

Filed Aug. 26, 1952

INVENTOR
L.R. COX DECEASED
CITIZENS TRUST COMPANY
OF SUMMIT, NEW JERSEY
HIS EXECUTOR
BY Charles Baraff AGENT United States Patent Office 2,874,220

Patented Feb. 17, 1959

2,874,220

CARRIER DISTRIBUTION CIRCUIT

Leslie R. Cox, deceased, late of Berkeley Heights, N. J., by Citizens Trust Company, executor, Summit, N. J., assignor to Bell Telephone Laboratories, Incorporated, New York, N. Y., a corporation of New York Application August 26, 1952, Serial No. 306,454

7 Claims. (Cl. 179—15)

This invention relates to alternating current distribution networks and more particularly to circuits for supplying a large number of modulators with carrier power from a common source.

An object of the invention is to supply a maximum number of modulators or other loads with minimum loss or wastage of power and with maximum transmission efficiency.

Another object of the invention is to supply a maximum number of modulators with carrier power by means of non-dissipative reactances proportioned to secure maximum transmission efficiency.

In accordance with the invention, a distribution circuit is provided for supplying a large number of loads, such as modulators, demodulators or the like. It comprises a power bus having equal condensers bridged thereacross to supply the respective loads with a single frequency and a common reactance coil which terminates the bus for tuning out the reactance of the condensers to effectively present a pure resistance to the single frequency source.

Referring to the figures of the drawing.

In carrier telephone circuits it is often desired to supply a large number of modulators or the like with carrier power from a common source, such as a harmonic generator or frequency multiplier circuit. The total power available from such sources is usually limited by practical considerations such as the size of the tubes used and available battery voltage. The power required by each modulator which may be the copper oxide type or the vacuum tube type or the like is defined by considerations of modulator performance. It is usually desired also that as many modulators as possible be supplied from the available source for reasons of economy. In addition, it is desired that accidental short circuit or open circuit of the wiring to any modulator should affect the transmission of carrier to other modulators as little as possible.

A simple series or parallel connection of the modulator loads to the power bus does not assure the protection required since an open circuit in the one case, or a short circuit in the other destroys the transmission to all loads. Accordingly, protection has been attempted with fair success by the inclusion of series resistance in each load circuit. All of the load circuits (each including its series protective resistance) would be then connected in parallel and the resultant parallel impedance of the combination would be matched by the use of a transformer to the source impedance. Power is lost, of course, in the protective resistances, which are usually of the same order of magnitude as the loads. In addition, because of the practical difficulty of obtaining efficient transmission of power into low impedances, substantial amounts of power are also lost in parasitic effects in connecting the low bus impedance to the source.

In carrier systems designed for transmitting many channels in the order of thousands, such loss of power becomes a serious drain and the problem arises of connecting the large number of carrier modulators or demodulators in a way which will remedy the difficulties encountered.

The distribution circuit, as disclosed therein, largely avoids both of these wastes of power: the former, because a non-dissipative reactance replaces the resistance as a protective element; the latter, because the effective impedance of each load circuit is stepped up by a tuned circuit impedance transformation by any desired amount so that the bus impedance, which is the resultant parallel impedance of all of the load circuits, may be provided to have a value consistent with the greatest transmission efficiency.

Figure 1:
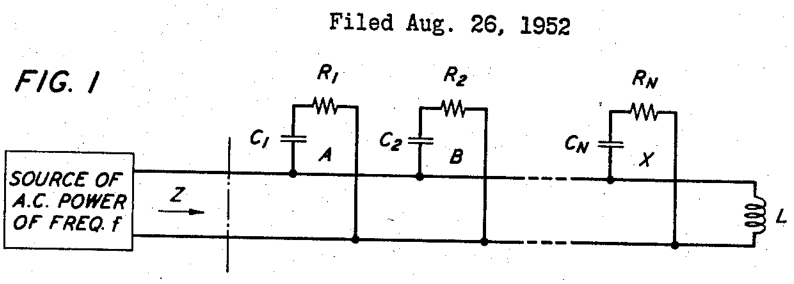
Fig. 1 shows a distribution circuit in accordance with the invention.

The basic principles of the invention may be explained by referring to the attached figures. Fig. 1 represents a distributing circuit arranged in accordance with the invention to supply power to a number, *n*, of unbalanced loads, $R_1$, $R_2$, . . . $R_N$, whose values are all equal. The condensers $C_1$, $C_2$, . . . $C_N$, are also equal in value and constitute the protective reactances which isolate the loads from one another and from the common bus in the event of accidental open or short circuits. The resultant parallel impedance of the load circuits has a negative reactance component, which is normally resonated by the positive reactance of an inductance coil L, so that the net input impedance, Z, is effectively a pure resistance.

Figure 2:
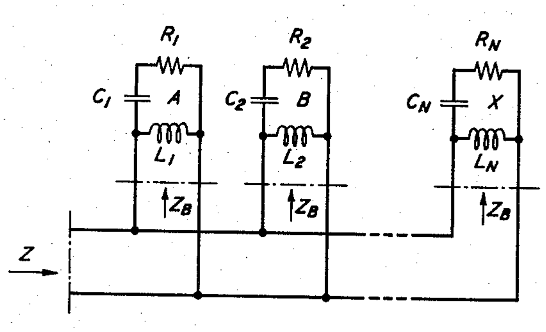
Fig. 2 shows an equivalent circuit diagram.

This impedance transformation may be explained by referring to Fig. 2, which represents a circuit equivalent in operation to that of Fig. 1. The common inductance, L, in the Fig. 1 is replaced in Fig. 2 by *n* inductances, $L_1$ to $L_N$, inclusive, each having a value nL, so that the effective parallel inductance of the *n* inductances is the same as the inductance, L, in Fig. 1. Considering any one, (A) for example, of the *n* identical load circuits, it is evident that each has the form of a parallel resonant circuit $L_1C_1$ in which the load resistance $R_1$ is a series element in the capacitive branch. The resultant impedance, $Z_B$, then, is non-reactive in each resonant branch and has a magnitude which is larger than that of the load resistance by an amount determined by the relative values of the resistance and the corresponding inductive and capacitive reactances $L_1$, $C_1$. The impedance Z of the entire distributing network is therefore also non-reactive and has the value, $$\frac{Z_B}{n}$$

It is found to be entirely practical to make $Z_B$ as much as one hundred times as great as the load resistance without dissipating appreciable power in the inductance or capacitance, so that for any value of *n* up to 100, it is easy to make the value of Z equal to that of the individual load resistances.

Figure 3:
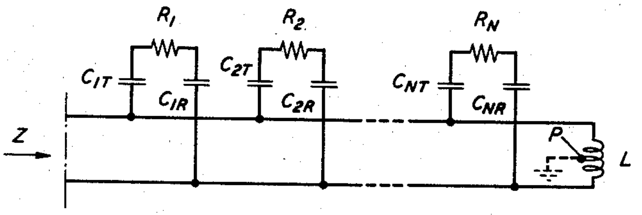
Fig. 3 shows a modification of the distribution circuit adapted for balanced circuit use.

Fig. 3 represent an arrangement suitable for supplying load circuits which are balanced to ground. The impedance relations in Fig. 3 are equivalent to those of Fig. 1 if the capacitances, $C_{1T}$, $C_{1R}$, to $C_{nT}$, $C_{nR}$, are all equal and are twice the capacitance of $C_1$ to $C_n$ in Fig. 1. The terminating coil L is grounded at a center tap point P for balanced circuit operation.

The examples which have been described apply to distributing circuits in which the load impedances are equal and non-reactive and the most favorable impedance, Z, for loading the source of power is non-reactive. The basic principle of the invention, however, may also be applied with equal facility to loads which are not equal in impedance, and to loads whose impedances have reactive components. Should unequal power division be desired, it could be likewise applied to loads whose impedances may be either equal or unequal, reactive or non-reactive. The impedance, Z, if desired, may also be designed to have a reactive component.

For example, if $R_n$ is not the same as the other loads $R_1$, $R_2$ etc., but equal power division is desired, then it is only necessary to compute the circuit elements $C_N$ and $L_N$ to give the same value of $Z_b$ as for the other loads. The division of power into the individual load networks and therefore into the individual loads for any load impedances is determined by the relative values of impedances $Z_B$. This is the underlying principle determining the nature of the power division into the various loads.

Figure 4:
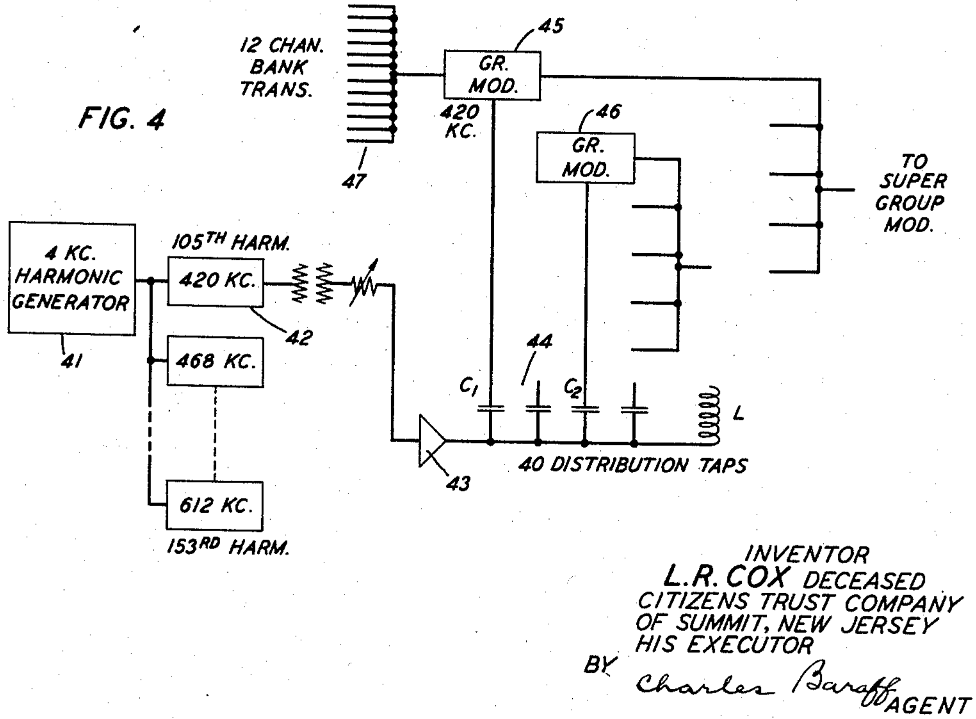
Fig. 4 shows a distribution circuit as a carrier supply for many group modulators.

Fig. 4 shows the distribution circuit aforementioned applied to a multichannel carrier system, supplying carrier power to a number of group modulators. The carrier system may be of the type disclosed in an article entitled "Frequency Division Techniques for a Coaxial Cable Network" published in Transactions A. I. E. E., volume 66, pages 1451–1459, 1947 by R. E. Crane et al.

The carrier frequency of 420 kilocycles is derived as the 105th harmonic from the primary source 41, represented as a basic 4 kilocycle harmonic generator of conventional type. A filter 42 segregates the 420 kilocycle and similar filters separate out the other carriers, such as 468 kilocycles . . . 612 kilocycles, the latter constituting the 153rd harmonic generated by the primary source 41.

The 420 kilocycle carrier frequency is amplified to a desired level by amplifier 43, whence it is transmitted to a distribution circuit 44 of the type illustrated in Fig. 1. The condenser $C_1$ serves to tap off the carrier frequency 420 kilocycles and transmits it to group modulator 45, while condenser $C_2$ serves as a tap to group modulator 46. A 12 channel bank 47 is coupled into the group modulator 45 in the well known manner. The group modulators 45 and 46 correspond to the loads $R_1$ and $R_2$ of Figs. 1 through 3, while L is the common terminating coil. Also, the arrangement of group carriers and supergroup carrier circuits is more fully disclosed in the aforementioned A. I. E. E. article.

The condensers, shown as unconnected in the distribution circuit 44, may be used to feed carrier power at 420 kilocycles to group demodulators (not shown).

It should be apparent that modifications may be made in its various parts without departing from the spirit of the invention.

What is claimed is:

1. An alternating current distribution circuit comprising a source of single frequency carrier, a pair of conductor leads connected thereto, equal loads connected in parallel across said conductors, equal non-dissipative reactances respectively connecting each load to said conductors, and a common reactance terminating said conductors for resonating said non-dissipative reactances at the carrier frequency to effectively present a pure resistance to said single frequency source.

2. An alternating current distribution network comprising a single frequency source, a feeder line connected thereto, and a plurality of modulators constituting equal loads bridged across said line, equal condensers connected between each load and said line respectively, a common inductance terminating said feeder line for tuning out the reactance of said condensers to effectively present a pure resistance to said single frequency source.

3. An alternating current distribution circuit comprising a source of carrier frequency, a feeder line connected thereto, a plurality of modulators constituting loads connected in parallel across said line, non-dissipative reactances each connecting a load to said line, the power division to each load from said source being determined by the relative input impedances to said loads respectively, and a common reactance terminating said feeder line for rendering each of said dissipative reactances a pure resistance at said frequency.

4. A carrier circuit comprising a harmonic generator, means for selecting a higher harmonic of the fundamental frequency, an amplifier for said selected frequency, and a carrier distribution circuit therefor comprising a line, a plurality of modulators constituting equal loads connected in parallel to said line, equal condensers connected between said line and loads, and a coil terminating said line for neutralizing the reactance of said condensers at the selected frequency to thereby present a pure resistance for matching the impedance of said harmonic generator.

5. A carrier distribution circuit comprising a frequency source, a pair of conductors connected thereto, carrier frequency modulators comprising separate loads arranged in parallel across said conductors, a non-dissipative reactance connected between each load and said pair, and a common impedance terminating said pair for tuning said reactors to said frequency, the resultant parallel impedance of all said loads providing an impedance match to said source.

6. The circuit of claim 5, wherein said reactance is a pair of equal condensers coupling each load directly to said conductors, and said common impedance is balanced with respect to ground.

7. In a multichannel carrier communication system, a common source of unmodulated carrier current of a single frequency, a feeder line, a multiplicity of equal load circuits each bridged directly across said feeder and common source, each individual bridging load including at least one protective condenser in series therewith, and a common inductance terminating said feeder line and having a reactance at the signal frequency of the source to resonate with the combined reactance of said multiple load circuits.

References Cited in the file of this patent

UNITED STATES PATENTS

| | | |
|---|---|---|
| 1,976,910 | Amy | Oct. 16, 1934 |
| 1,995,731 | Amy | Mar. 26, 1935 |
| 2,000,190 | Rettenmeyer | May 7, 1935 |
| 2,023,857 | Satterlee | Dec. 10, 1935 |
| 2,064,227 | Shumard | Dec. 15, 1936 |
| 2,073,933 | Herbst | Mar. 16, 1937 |
| 2,163,750 | D'Heedene | June 27, 1939 |
| 2,205,469 | Curtis | June 25, 1940 |
| 2,414,541 | Madsen | Jan. 21, 1947 |
| 2,421,333 | Katehatouroff et al. | May 27, 1947 |